(No Model.)
W. S. SWIFT.
EGG BEATER.
No. 583,775. Patented June 1, 1897.
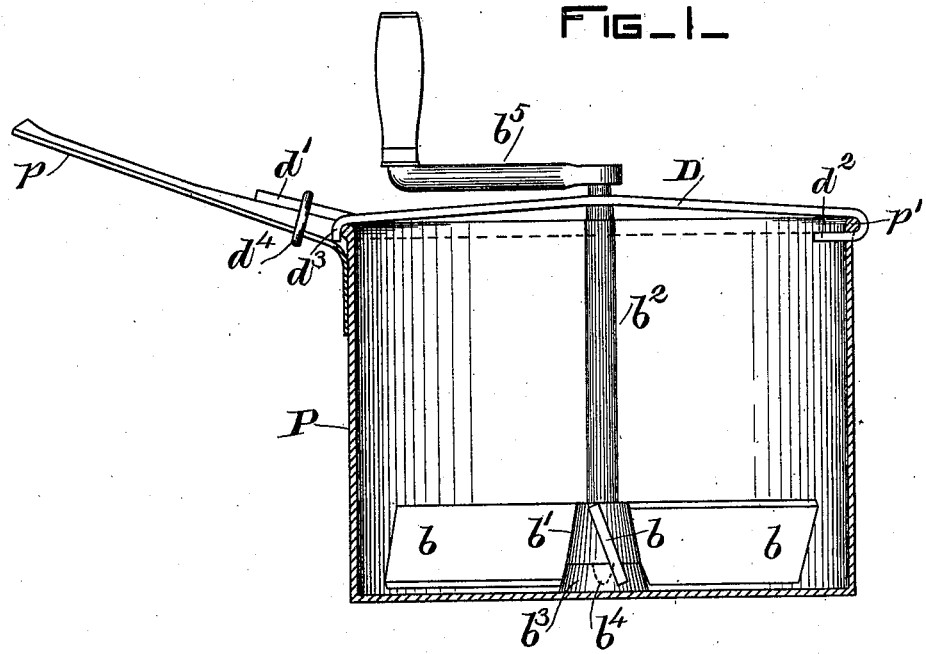
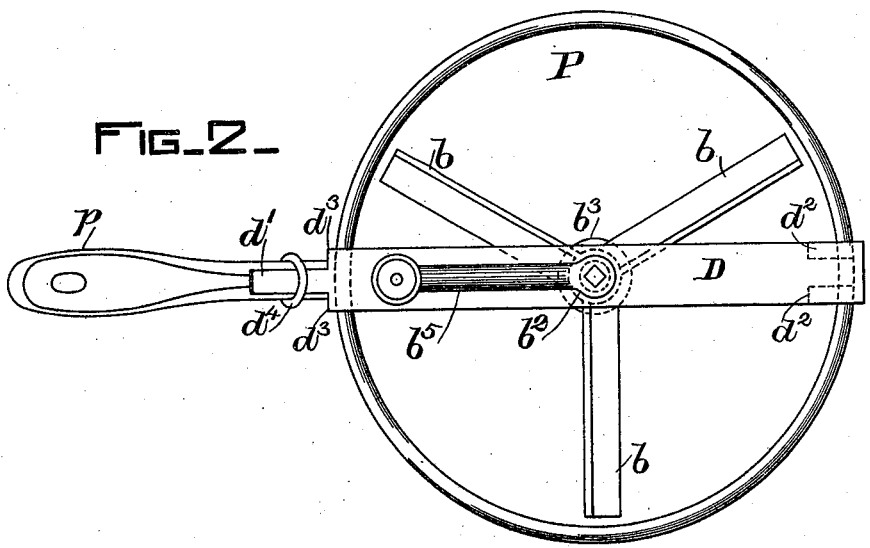
WITNESSES
A. E. H. Lyte.
A. O. Orne
INVENTOR
Willis S. Swift
By his Attorney
Benjamin Phillips

UNITED STATES PATENT OFFICE.

WILLIS S. SWIFT, OF GLOUCESTER, MASSACHUSETTS.

EGG-BEATER.

SPECIFICATION forming part of Letters Patent No. 583,775, dated June 1, 1897.

Application filed March 23, 1896. Serial No. 584,562. (No model.)

*To all whom it may concern:*

Be it known that I, WILLIS S. SWIFT, a citizen of the United States, residing in Gloucester, in the county of Essex and Commonwealth of Massachusetts, have invented a new and useful Improvement in Cake and Egg Beaters, of which the following, taken in connection with the accompanying drawings, is a specification.

The present invention relates to improvements in devices of the above class; and it consists of the improved form and arrangement of parts hereinafter more specifically set forth and claimed.

The object of the present invention is to provide a cake and egg beater which may be conveniently attached to the usual form of saucepan, which not only saves the expense of a specially-designed pan, but is a matter of great convenience in cooking, since the food may be cooked in the same pan in which the stirring operation is performed.

The present invention is illustrated in the accompanying drawings, in which—

Figure 1 is a sectional elevation of a saucepan provided with my improved beater. Fig. 2 is a plan view of same.

Similar letters of reference refer to similar parts throughout both views.

In the drawings, P represents a common form of saucepan provided with a handle $p$.

The reference-letters $b\ b\ b\ b$ represent a series of stirring-blades, which project radially from a hub $b'$. The hub $b'$ is fixedly secured to a shaft $b^2$, which is free to rotate in suitable bearings. The lower bearing of the shaft $b^2$ is formed in a plate or block $b^3$, which is secured to or rests upon the bottom of the pan P, and in which is formed a socket $b^4$, which is engaged by a pin upon the lower end of the rod $b^2$, as shown by dotted lines in Fig. 1.

It will be noted that the blades $b\ b\ b\ b$ are inclined to the bottom of the pan, which tends to give the eggs or dough to be beaten an "over-and-over" movement, which greatly facilitates the beating operation. It will also be noted that the blades $b\ b$, &c., project downwardly from the hub $b'$ along the block $b^3$ until they are almost in contact with the bottom of the pan P. This is also a feature of importance, particularly in connection with the inclined blades $b\ b$, &c., since it prevents any of the material to be beaten from being left upon the bottom of the pan and escaping the beating operation. The upper bearing of the shaft $b^2$ is formed in what I have called a "cross-bar" D, which is secured in position upon the pan P and which acts with the block $b^3$ to hold the shaft $b^2$ in position, leaving it free to be rotated by the operating-crank $b^5$, which is secured to the shaft $b^2$ in the usual manner.

The cross-bar D constitutes an important feature of the present invention and is preferably formed of a single strip of metal, being provided with the downwardly and inwardly bent lugs $d^2\ d^2$ and with the tongue $d'$ and downwardly-bent lugs $d^3\ d^3$. The lugs $d^2\ d^2$ engage the rim $p'$ of the pan P opposite to the handle $p$ and extend into the pan P through suitable perforations in its sides. The tongue $d'$ is bent slightly upward and projects along the handle $p$. The lugs $d^2\ d^2$ engage the rim $p'$ upon opposite sides of the handle $p$ and project along the side of pan P. On the handle $p$ is a movable ring $d^4$, which is adapted to be slid over the tongue $d'$ and to hold it firmly in position upon the handle $p$.

The above-described arrangement is such that the lugs $d^2\ d^2$ act to hold one end of bar D in position, while the other end is held by lugs $d^3\ d^3$, tongue $d'$, and ring $d^4$, and by removing ring $d^4$ from tongue $d'$ the bar D can be readily removed from the pan.

The operation of my invention has been sufficiently described in connection with the foregoing description of the form and arrangement of parts.

I therefore claim as novel and desire to secure by Letters Patent of the United States—

1. The combination with a saucepan and its handle, of a series of stirring-blades and their driving-shaft, a cross-bar supporting said shaft, lugs on the cross-bar engaging the rim of the pan, and clamping means on the handle and cross-bar coöperating with said lugs to hold the cross-bar in position, substantially as described.

2. The combination with a saucepan and its handle, of a series of stirring-blades and their driving-shaft, a cross-bar supporting said shaft, downwardly and inwardly bent lugs upon one end of the cross-bar engaging the rim of the pan, downwardly-bent lugs and an outwardly-projecting tongue upon the opposite end of the cross-bar, said lugs engaging the rim of the pan and said tongue projecting along the handle, and a movable ring upon the handle engaging the tongue, substantially as described.

3. The combination with a suitable pan having a handle projected therefrom, a circular bearing-block secured to the bottom of said pan, a shaft having a bearing in said block, and stirring-blades projected radially from said shaft, a cross-bar provided with a bearing for the upper end of said shaft, lugs on the cross-bar engaging apertures in the rim of the saucepan, and suitable clamping device between said cross-bar and the handle of said pan, substantially as described.

In testimony whereof I have hereunto set my hand in the presence of two attesting witnesses.

WILLIS S. SWIFT.

Witnesses:
FRANZ E. SMOTHEN,
CYRUS STORY.